United States Patent [19]

Ross

[11] 4,276,898
[45] Jul. 7, 1981

[54] DELIVERY SYSTEM FOR PNEUMATIC VESSELS

[75] Inventor: Peter Ross, New York, N.Y.

[73] Assignee: Stop-A-Flat Corporation, Huntingdon Valley, Pa.

[21] Appl. No.: 117,008

[22] Filed: Jan. 30, 1980

[51] Int. Cl.³ .................. F16K 15/20; F16K 51/00
[52] U.S. Cl. .................. 137/231; 137/315; 137/843; 141/38; 141/98; 141/383
[58] Field of Search .......... 137/1, 15, 223, 231, 137/315, 317, 319, 321, 322, 323, 843; 141/38, 98, 382, 383; 222/494; 251/149.1

[56] References Cited

U.S. PATENT DOCUMENTS

| 1,854,797 | 4/1932 | Kirkpatrick | 137/231 |
| 2,320,042 | 5/1943 | McMahan | 141/38 |
| 2,652,181 | 9/1953 | Rupp | 141/38 |
| 2,656,083 | 10/1953 | Blomgren | 141/38 |
| 2,991,629 | 7/1961 | Rose | 141/38 |
| 3,021,877 | 2/1962 | Wellsch | 141/38 |
| 3,043,348 | 7/1962 | Wellsch | 141/38 |
| 3,224,471 | 12/1965 | Zängl | 141/38 |
| 3,498,315 | 3/1970 | Graves et al. | 137/843 |

FOREIGN PATENT DOCUMENTS 6493 of 0000 Australia .................. 137/231

OTHER PUBLICATIONS

Chalfont Industries,—Stop-a-Flat; Article Advertised in Automotive News Magazine.
Luben Industries, Inc.,—Tiretainium Puncture Preventative.

Primary Examiner—Martin P. Schwadron
Assistant Examiner—G. L. Walton
Attorney, Agent, or Firm—Weiser, Stapler & Spivak

[57] ABSTRACT

The delivery system functions under pump pressure to introduce a fluid such as a tire sealant interiorly of a pneumatic vessel such as a tire through the air valve without deflating the vessel. A valve core extractor functions in a pressurized atmosphere to remove and retain the valve core without loss of pressure. A pump including a resilient, one way check valve introduces the fluid through the valve, also without loss of pressure. Following introduction of the desired quantity of the fluid, the valve core extractor is functioned in reverse to reinsert the valve core, all without loss of system pressure.

15 Claims, 4 Drawing Figures

DELIVERY SYSTEM FOR PNEUMATIC VESSELS

BACKGROUND OF THE INVENTION

The present invention relates generally to the field of treating pneumatic vessels such as pneumatic tires, and more particularly, is directed to an apparatus and method for applying a treatment liquid, such as a sealing compound, into a vessel, such as a tire, without first deflating the vessel.

Prior workers in the art have developed methods and apparatus for introducing a sealing compound into a tire for sealing puncture leaks in pneumatic tires. In one type of known operation, a tire sealant compound is packaged under pressure in a portable aerosol container for direct use by a motorist under emergency conditions. One such aerosol container is presently being distributed by Nationwide Industries, Huntingdon Valley, Pa., under the trademark "Fix-A-Flat". In this device, the nozzle of the aerosol container is designed to be threadedly engaged on the tire valve, the valve core is automatically opened, and then the container contents are introduced into the interior of the tire. As above set forth, this is usually employed for emergency conditions wherein the tire had been completely deflated due to a puncture or other exterior cause. The aerosol container contains enough pressurized gas to inflate the tire sufficiently to allow the motorist to drive to the nearest service station. Sufficient sealing compound is present in the container and is injected into the tire through the tire valve with the pressurized gas to temporarily seal the puncture, until such time as a skilled mechanic can make proper, permanent repairs.

In another system designed to introduce a liquid interiorly of a penumatic vessel, which system has been previously employed by the assignee of the present invention under the trademark "STOP-A-FLAT", it is the practice to introduce a sealing compound interiorly of the pneumatic tire prior to an actual puncture or other emergency condition. By introducing such a sealing compound, a tire can be rendered substantially puncture proof throughout the entire effective life of the tire itself. When utilizing such a prior art system for applying the sealing compound interiorly of the pneumatic tire, it previously was necessary to first remove the valve core from the tire valve and then deflate the tire entirely. Once the tire pressure had been reduced to atmospheric pressure, then a suitable sealing liquid could be pumped through the unobstructed tire valve stem into the interior of the tire wherein the sealing compound remained for puncture sealing purposes. After introduction of the sealing compound, the valve core was then reinstalled and the tire was reinflated, in the conventional manner.

While the prior art systems have generally performed satisfactorily for tire sealing purposes, the systems were somewhat expensive in use inasmuch as considerable time and effort was required to place the proper amount of sealing compound within each tire. The additional operations necessitated by deflating the tires including such steps as elevating the vehicle by means of a lift or jack, waiting the required time for the tires to deflate and the required time to reinflate the tires after introduction of the sealing compound are directly attributable to the increased costs. The present invention seeks to overcome these time consuming operations by providing a system capable of operation under pressurized conditions, thereby eliminating all of the previous time consuming steps involved with deflation and inflation of the tires.

SUMMARY OF THE INVENTION

The present invention relates generally to pneumatic vessel treatment, and more particularly, is directed to a system designed to deliver interiorly of the vessel a treatment fluid in a pressurized atmosphere.

The present invention includes generally a liquid pump of conventional design and configuration which is utilized to pump a treatment liquid from a container, through a discharge fitting to a pneumatic vessel. A one way valve is interposed between the pump and the discharge fitting to prevent backflow through the discharge fitting under impetus of the interior pressure maintained within the pneumatic vessel.

The one way valve includes a seat and a resilient, elongated plug which is pinned in position to normally bias against the seat to prevent backflow through the valve. The resilient construction of the plug allows the plug to be compressed sufficiently under pump pressure to temporarily open the valve for passage of a treatment liquid, such as a sealing compound, therethrough when the pump is activated. Upon the release of pump pressure, the natural memory and resiliency of the plug material acts in conjunction with the vessel interior pressure to automatically reseat the plug and to close the valve.

Preferably, the plug is retained concentrically within the valve chamber and defines an annular space between the exterior periphery of the valve plug and the interior periphery of the valve chamber. Accordingly, when the plug is compressed sufficiently under pump pressure to permit flow of sealing compound, the sealing compound flows about the plug through the annular space toward the discharge fitting.

A valve core extractor assembly is annexed to the one way valve at the discharge fitting and includes an elongated conduit in fluid communication with the discharge fitting and the one way valve. A rotatable valve core extractor is axially slidable within the conduit from an initial, inward position in contact with the vessel valve core when seated within the valve stem to a retracted position wherein the valve core, upon disengagement by the extractor from the valve stem, is urged away from the discharge fitting. The extractor includes O-ring seals to prevent the escape of vessel pressure between the elongated conduit and the valve core extractor when the extractor is in either its initial or retracted positions.

The combination of a first seal provided between the valve seat and the resilient plug of the one way valve construction and a second seal provided by the O-rings between the extractor and the elongated conduit cooperate to furnish a completely sealed valve and extractor assembly under all conditions of operation, that is when the extractor rod is in either its initial, forward position or in its rearward, valve core extracted position or when the pump is activated to pump a treatment liquid under pressure into the pneumatic vessel or when the pump is inactive.

In the following description, the invention will be described in a particular embodiment wherein the pneumatic vessel is an inflatable tire and wherein the treatment liquid comprises a tire sealing compound for purposes of illustration. However, it will be appreciated that the concept of introducing a fluid under pressure could have other applications and uses, and accordingly, the invention is not limited only to pneumatic tires and sealants, but is also applicable to any system wherein it is desirable to introduce a fluid interiorly of a pneumatic vessel without first relieving the pressure.

It is therefore an object of the present invention to provide an improved delivery system for tire sealant of the type set forth.

It is another object of the present invention to provide a novel delivery system and apparatus capable of applying a tire sealing compound interiorly of a tire without deflating the tire.

It is another object of the present invention to provide a novel delivery system for tire sealant comprising a one way valve receiving the sealing compound under pressure from a pump, a discharge fitting in fluid communication with the one way valve and the tire stem of a tire valve, and a valve core extractor assembly in fluid communication with the discharge fitting, the valve core extractor assembly being capable of removing the tire valve core without loss of pressure to permit the pump to introduce the sealing compound interiorly of the tire without first deflating the tire.

It is another object of the present invention to provide a novel delivery system for tire sealant comprising a pump, a one way valve which is openable only upon function of the pump, a discharge fitting in fluid communication with the valve to introduce the tire sealing compound under pressure to a tire valve stem and a valve core extractor suitable to remove or replace the valve core within the valve stem without loss of tire pressure.

It is another object of the present invention to provide a novel delivery system for tire sealant that includes a pump and a one way valve in fluid communication with the pump, the one way valve incorporating a stationary, resilient plug having an initial condition in sealing arrangement within the valve and a compressed condition wherein fluid under pump pressure can pass about the plug, through the one way valve and into the tire. It is another object to provide a novel delivery system for tire sealant that is simple in operation, inexpensive in manufacture and trouble free when in use.

Other objects and a fuller understanding of the invention will be had by referring to the following description and claims of the preferred embodiment thereof taken in conjunction with the accompanying drawings, wherein like reference characters refer to similar parts throughout the several views and in which:

BRIEF DESCRITPION OF THE DRAWINGS

DESCRIPTION OF THE PREFERRED EMBODIMENT OF THE INVENTION

Figures 1, 2:
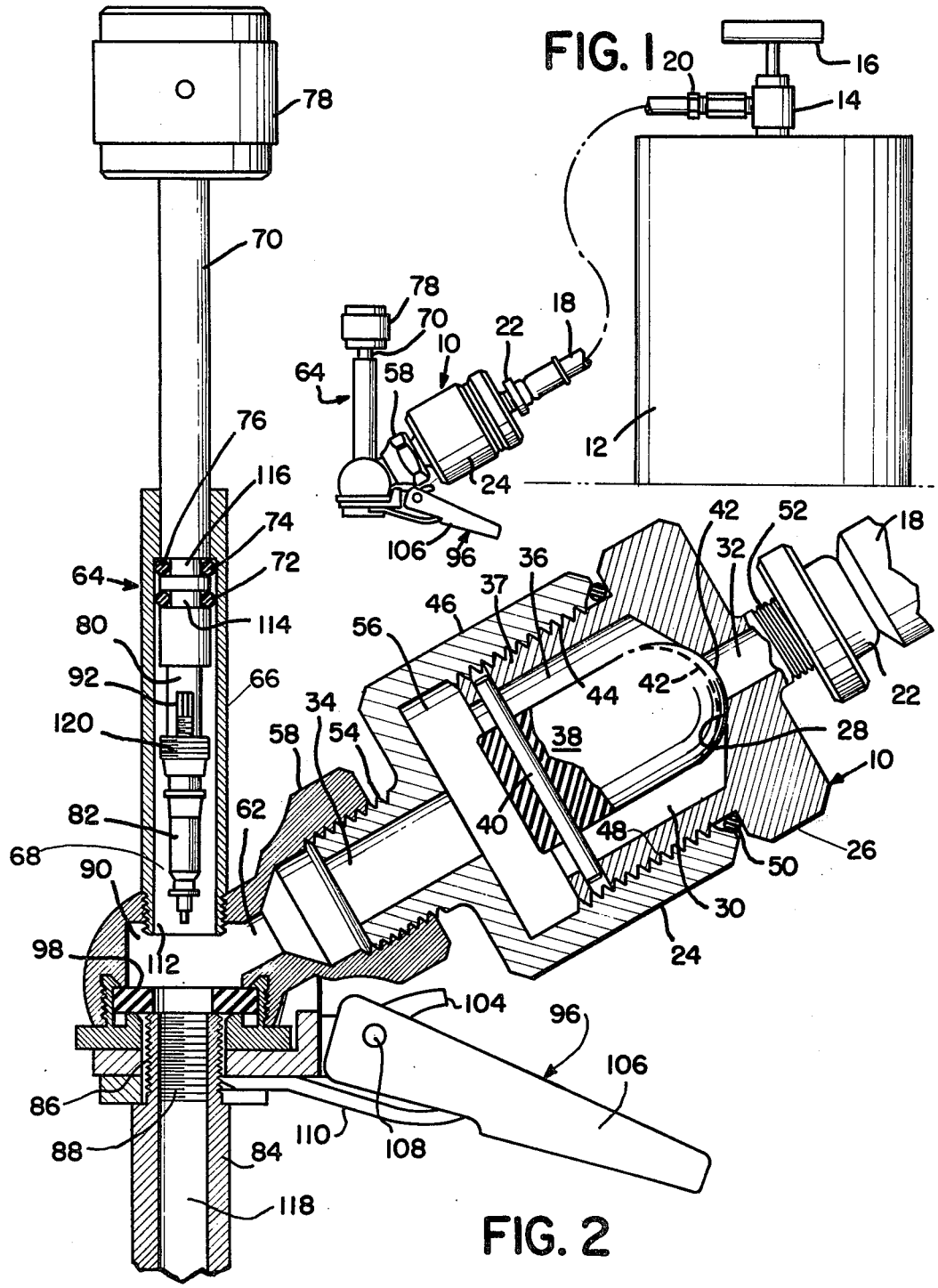
FIG. 1 is an elevational view, on reduced scale, showing the pump and combination valve and extractor assembly in schematic arrangement.
FIG. 2 is a cross sectional view taken through the combination valve and extractor assembly showing the extractor rod in its second or rearward position.

Although specific terms are used in the following description for the sake of clarity, these terms are intended to refer only to the particular structure of the invention selected for illustration in the drawings, and are not intended to define or limit the scope of the invention.

Referring now to the drawings, there is illustrated in FIG. 1 a valve and extractor assembly 10 in fluid communication with a liquid tire sealant container 12 through a conventional hand pump 14. While a hand pump is shown for purposes of illustration, it will be appreciated that the system could function with other pumping devices, for example, an automatic motor driven pump. A pump handle 16 is reciprocal to pump the fluid contents (not shown) of the container 12 through the hose 18 in conventional manner. The hose 18 is connected in fluid tight arrangement with the pump 14 through a hose connector 20 and to the valve and extractor assembly 10 through an outlet hose connector 22. The hose connectors 20, 22 are conventional in design and can be threaded in well known manner to threadedly interconnect the hose ends in a known, fluid tight manner, respectively to the pump 14 and to the valve body 26.

Figure 3:
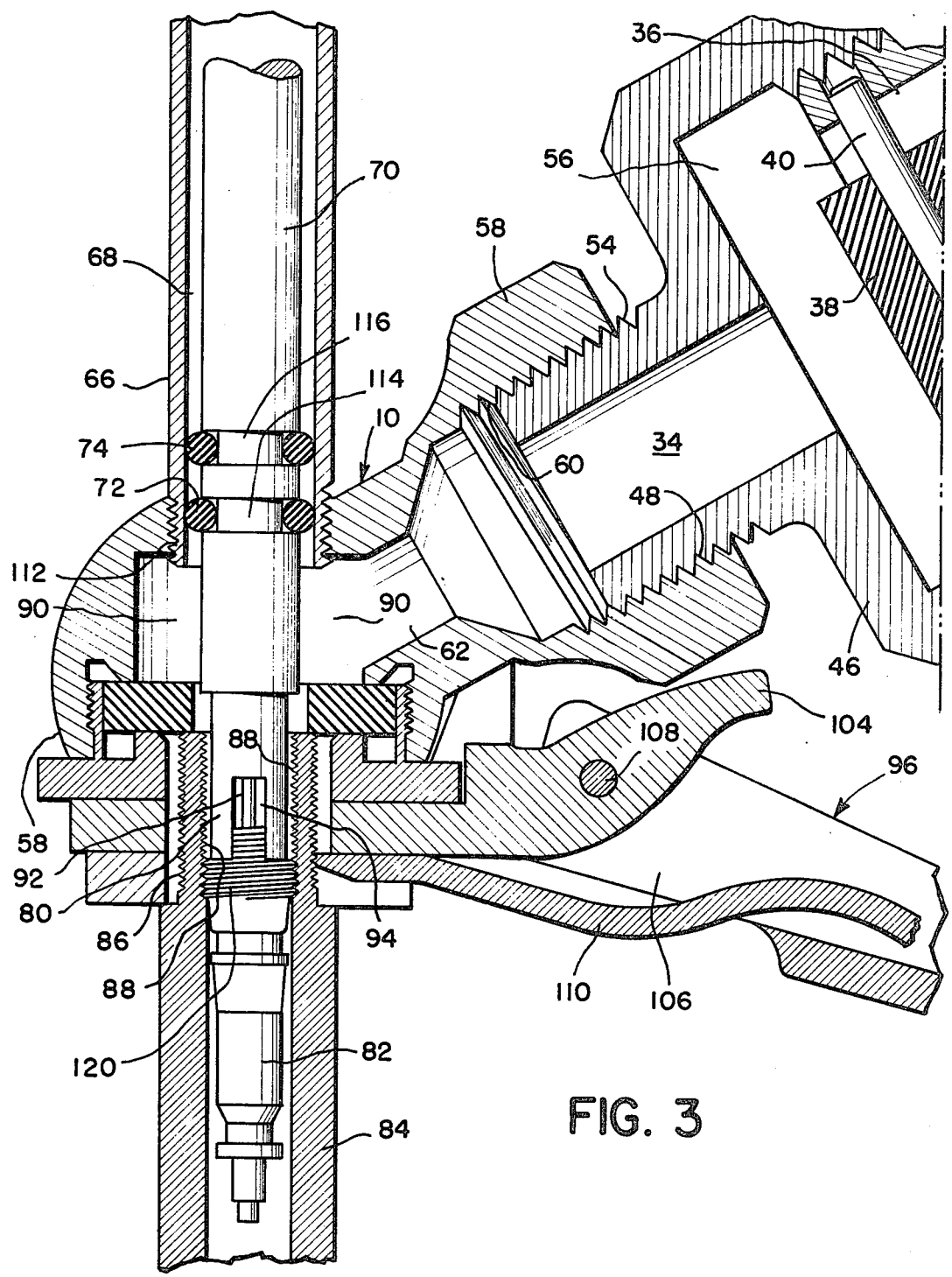
FIG. 3 is an enlarged, partial, sectional view similar to FIG. 2 only showing the extractor rod in its initial or forward position.
Figure 4:
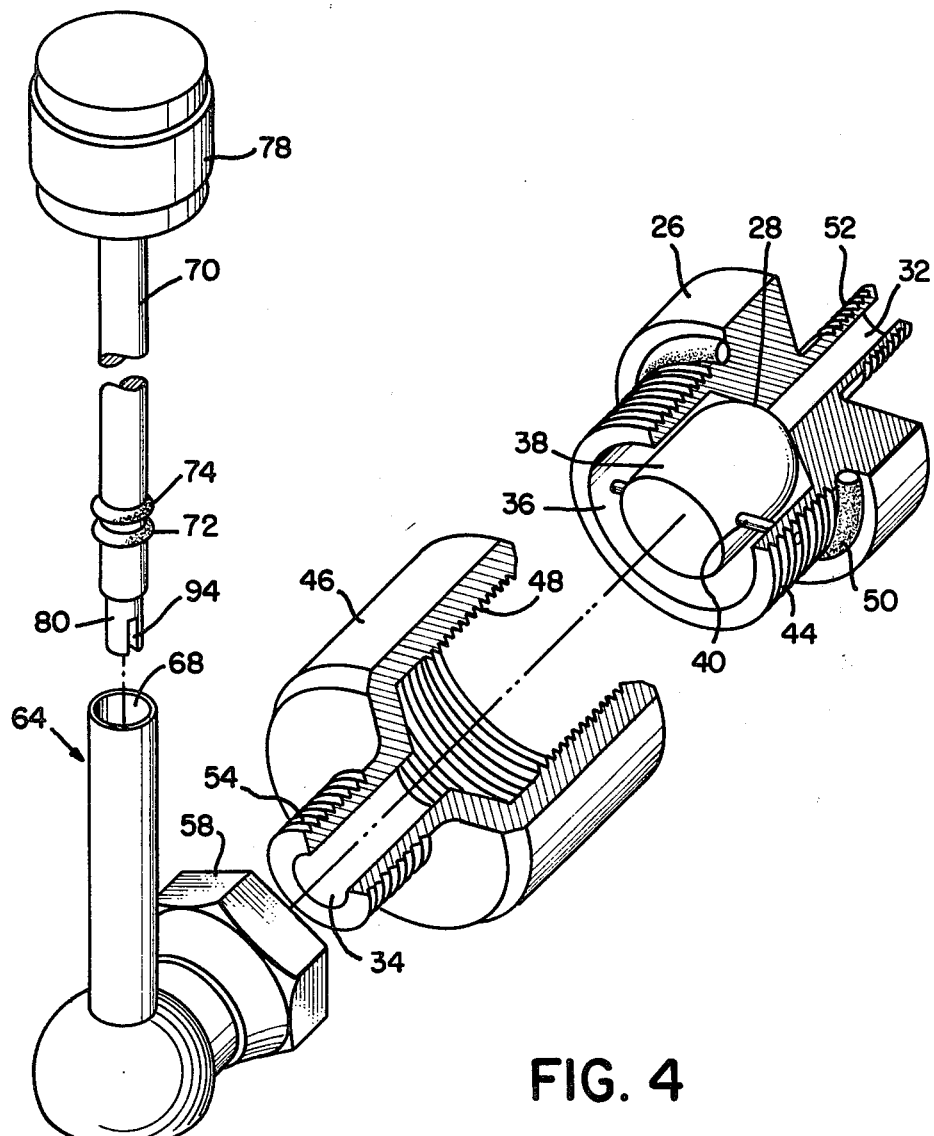
FIG. 4 is an exploded, perspective view of the combination valve and extractor assembly,, partially broken away to expose interior construction details.

As best seen in FIGS. 2, 3 and 4, the valve and extractor assembly 10 comprises essentially a valve body 26 and a cooperating, fluid tight cover 46. The valve body 26 is interiorly formed to provide an internal passage 30 which at its inlet end communicates with the valve inlet opening 32 and at its outlet end with the pressure chamber 56 defined within the valve cover 46. Adjacent the inlet opening 32, the valve internal passage 30 is rounded or otherwise formed to provide a smooth valve seat 28 for alternately sealing or unsealing the inlet opening 32 in response to pressure direction changes within the system as hereinafter more fully set forth.

A generally cylindrical, solid plug 38, preferably formed of suitable resilient, sealing material is positioned within the internal passage 30 and is stationarily held therein by the diametrically aligned pin 40. The pin 40 can be secured in the walls 37 of the valve body 26 in known manner to prevent axial displacement of the solid plug 38. Preferably, the plug 38 is fabricated of a resilient, pliable material that is chemically inert to action of the sealing compound (not illustrated) such as natural rubber, plastic or other material of suitable resilient, sealing characteristics. One material that has been found satisfactory for the purpose is polyurethane plastic having a durometer of approximately 35. The diameter of the resilient plug 38 must be smaller than the diameter of the internal passage 30 to thereby define an annular passage 36 to faciliate the movement of the sealing compound (not shown) through the valve and extractor assembly 10 upon function of the pump handle 16.

As best seen in FIG. 2, the pin 40 secures the plug 38 in position with its rounded nose or end 42 in sealing engagement upon the valve seat 28. Accordingly, under unstressed conditions, the resilient plug 38 normally biases against the valve seat 28 and seals the inlet opening 32 to prevent the leakage or loss of tire pressure therethrough when the valve and extractor assembly 10 is connected to tire valve stem 84 with the valve core 82 removed. See the full line representation of the valve plug rounded end 42 in FIG. 2. When the pump handle 16 is reciprocated to activate the pump 14, the fluid pressure imposed at the inlet opening 32 will be sufficient to compress the plug 38 sufficiently to compress the rounded end 42 to the dotted line position as illustrated in FIG. 2. In this latter condition, the inlet opening 32 will be in fluid communication with the annular passage 36 to thereby permit the sealing compound (not shown) to pass through the one way valve 24 for injection into the pneumatic tire (not shown) through the valve stem 84. As illustrated, the hose outlet connector 22 threadedly engages the valve body inlet threads 42 in a fluid tight engagement in conventional manner.

The valve cover 46 is formed with internal threads 48 which threadedly engage the external threads 44 of the valve body 26. An O-ring gasket 50 seals the inner connection between the valve body 26 and the valve cover 46 to prevent loss of tire pressure or leakage of sealing compound thereabout. The valve body 26 and valve cover 46 define a pressure chamber 56 therebetween which is positioned in fluid communication with the annular passage 36 to receive therein either pressurized air from within the tire (not illustrated) when the valve and extractor assembly 10 is first connected to the valve stem 84 and the valve core is removed or to receive the sealing compound (not shown) when the pump 14 is activated. An outlet opening 34 is provided in fluid communication with the pressure chamber 56 to either facilitate flow of sealing compound to the valve stem 84 when the pump 14 is activated and the resilient plug is compressed to the dotted line position of FIG. 2 or to recieve therein pressurized air introduced through the valve stem 84 when the resilient plug 38 is in the full line position illustrated in FIG. 2 with the pump 14 not in operation. The valve cover outlet 34 includes an exteriorly threaded section 54 for threaded, air and liquid tight engagment in the threaded, hollow fitting 58.

Referring now to FIGS. 2 and 3, the threaded fitting 58 includes internal threads 60 which threadedly receive the exteriorly threaded section 54 of the valve cover 46 in a fluid tight connection. An internal fluid passage 62 is provided in fluid communication with the valve cover outlet opening 34 whereby either pressurized air from the valve stem 84 or sealing compound from the container 12 can pass therethrough, depending upon the operating conditions. The threaded fitting includes an upper opening 112 to which is connected the elongated hollow conduit 66 of the valve core extractor assembly 64 in a fluid tight manner such as by a threaded engagement. The elongated conduit 66 defines a hollow, interior channel 68, which channel is in fluid communication with the passage 62 within the threaded fitting 58. Accordingly, air pressure introduced into the system through the valve stem 84 or sealing compound introduced into the system under impetus of the pressure generated by the pump 14 is also impressed at the hollow channel 68 under all conditions of use.

As best seen in FIGS. 2, 3 and 4, an extractor rod 70 is reciprocal within the elongated conduit 66 from an inward, valve core installing or removing position as illustrated in FIG. 3 to an outward valve core extracting position as shown in FIG. 2. It should be noted that the extractor rod 70 is provided with a pair of spaced grooves 114, 116 within which the 0-ring seals 72, 74 are retained. The seals 72, 74 facilitate reciprocal movement of the extractor rod 70 within the hollow channel 68 for valve core removal and replacement without loss of tire air pressure thereabout during any reciprocal position of the rod 70. As shown in FIG. 2, the hollow channel 68 terminates outwardly in a circular shoulder 76 to thereby prevent easy disassociation of the parts. As illustrated, the hollow conduit channel 68 is in fluid communication with the one way valve 24 through the passage 62, the outlet opening 34 and the pressure chamber 56. Additionally, the hollow channel 68 is in fluid communication with the interior of the pneumatic tire (not illustrated) through the hollow channel 118 of the valve stem 84 and the communicating interior passage 90.

Referring to FIGS. 2, 3 and 4, it will be seen that the extractor rod 70 terminates inwardly in a bifurcated end 80 which defines an inwardly open operating groove 94. The groove 94 is sized to overfit and turn the extractor grip 92 of the valve core 82. Accordingly, by inwardly urging the extractor rod 70 to its inward position, the groove 94 in the rod end 80 can be positioned over the grip 92 of the valve core 82 in engaging relationship. Then by turning the outer control knob 78, the valve core 82 can be threadedly engaged or disengaged through interaction of the valve core external threads 120 with the internal threads 88 of the valve stem 84. Accordingly, in order to remove the valve core 82 from the valve stem 84, the extractor rod is urged to its inward position as illustrated in FIG. 3 and the control knob 78 is turned to threadedly disengage the valve core from the valve stem. After disengagement, the extractor rod 70 is pulled to its rearward position as illustrated in FIG. 2 together with the valve core 82 which rides outwardly of the valve stem 84 under impetus of the tire pressure. With the valve core 82 thus removed, the pressure chamber 56 of the one way valve 24 is in direct communication with the interior of the tire (not shown) through the connecting outlet opening 34, the fitting passage 62, the connecting passage 90 and the interior channel 118 defined within the valve stem 84.

With the extractor rod 70 pulled to its rearward position as illustrated in FIG. 2, loss of tire air pressure is prevented by the action of the O-ring seals 72, 74 against the interior walls of the elongated conduit 66 and by the seating of the rounded nose 42 of the resilient plug 38 against the valve seat 28.

In order to introduce the tire sealing compound (not shown) into the interior of the tire (also not shown), the parts are positioned as illustrated in FIG. 2 and then the pump handle 16 is activated to transfer the liquid contents from the container 12 through the hose 18 to the valve body inlet opening 32. The sealing compound impinges upon the rounded nose 42 of the plug 38 under pressure from the pump 14, which is sufficient to compress the material of the plug to thus urge the rounded end 42 of the plug away from the valve seat 28, as illustrated in dotted line representation in FIG. 2. Once the plug 38 has been compressed by pump pressure, the seat 28 is exposed to thereby allow the sealing compound to enter the pressure chamber 56 about the plug 38 after passage through the annular channel 36. As above set forth, the pressure chamber 56 is in fluid communication with the interior 118 of the valve stem 84. The sealing compound is thus introduced interiorly of the tire without the need to deflate the tire. Of course, in order to cause flow of the sealing compound toward the tire, the pressure generated by the pump 14 must be greater then the pressure maintained within the interior of the pneumatic tire and also must be sufficient to compress the plug away from the valve seat 28. The pin 40 secures the plug 38 within the valve body and prevents axial movement therewithin.

A valve stem connection assembly 96 may be affixed to the bottom of the threaded fitting 58 by utilizing a threaded bushing 98 which is threadedly, sealingly engaged to the fitting 58. A leak proof washer 102 prevents the loss of air pressure at the bushing 98. The bushing includes a concentric opening 100 to thereby permit passage of the sealing compound therethrough under urging of the pump pressure. An extension finger 104 is clamped between the bushing 98 and the bottom of the fitting 58 to provide a suitable extension upon which to pivotally engage the operating lever 106 through the pivot pin 108. A thread engaging spring 110 has one end secured to the end of the operating lever 106 and is configured to normally bias its inward end inwardly toward the exterior threads 86 of the valve stem 84. By pulling the lever 106 upwardly as viewed in the illustrations of FIG. 2 and FIG. 3, the inward end of the spring 110 can be pulled away from the threads 36 to thereby allow the valve extractor assembly 10 to either be applied to or removed from the threaded end of the valve stem 84. Upon releasing the upward pressure on the lever 106, the lever will pivot downwardly about the pin 108 to thereby allow the inward end of the spring to assume its natural, forward position to contact the valve stem. Accordingly, in order to affix the valve extractor assembly 10 to the valve stem 84, the lever 106 is simply pulled upwardly to retract the spring 110 until the bushing 98 overfits the threaded end 86 of the valve stem 84. With the parts thus positioned, pressure on the lever 106 is released to allow the forward or inward end of the spring 110 under spring bias to engage the exterior threads 86 of the valve stem to hold the parts in position.

Although the invention has been described with a certain degree of particularly, it is understood that the present disclosure has been made only by way of example and that numerous changes in the details of construction and the combination and arrangement of parts may be resorted to without departing from the spirit and scope of the invention.

What is claimed is:

1. In a delivery system including a pump for pumping a treatment fluid into the interior of a pneumatic vessel under pressure through the valve thereof wherein the valve includes a valve stem and a valve core, the combination of a one way valve housing, said one way valve housing being in fluid communication with the pump and the vessel to permit flow of the treatment fluid toward the vessel when the pump is activated, the one way valve housing including a first seal to prevent loss of vessel pressure, the first seal comprising a valve seat, a resilient plug and means to normally bias the plug against the seat to close the one way valve housing; and an extractor assembly fitting means, said one way valve housing being securely engaged to said extractor fitting means, a valve core extractor assembly means in fluid communication with the one way valve housing, the valve core extractor assembly means comprising a valve core extractor means to remove the valve core and a second seal to prevent loss of vessel pressure when the valve stem is removed, the valve core extractor assembly means and the one way valve housing being in fluid communication with the pressurized interior of the pneumatic vessel when the valve stem is removed, the valve core extractor means being adapted to remove or replace the valve core within a pressurized atmosphere without loss of pressure and said valve core extractor assembly means being securely engaged to said extractor fitting means.

2. The delivery system of claim 1 wherein the one way valve housing comprises a body containing the said valve seat and wherein the resilient plug is adapted to be responsive to pump pressure alternately to bias against the seat when the pump is not in operation to prevent loss of vessel pressure and to expose the seat when the pump is in operation, whereby the treatment fluid can flow past the seat.

3. The delivery system of claim 2 wherein the plug is restrained within the valve body to define an annular passage therebetween whereby the treatment liquid can flow through the passage about the plug upon activation of the pump.

4. The delivery system of claim 2 wherein the plug is fabricated of resilient material to a generally solid, cylindrical configuration and wherein the plug is restrained within the valve body to maintain coaxial alignment within the body.

5. The delivery system of claim 2 wherein the means to normally bias the plug comprises a pin interconnected through the valve body and through one end of the plug, the pin being adapted to prevent axial movement of the said one end of the plug relative to the valve body.

6. The delivery system of claim 5 wherein the second end of the plug is normally biased against the said seat to form a part of the first seal.

7. The delivery system of claim 6 wherein the first end of the plug is planar and wherein the second end of the plug is rounded.

8. The delivery system of claim 1 wherein the valve core extractor means comprises an elongated conduit and an extractor rod reciprocal within the conduit between an inward, valve core engaged position and an outward, valve core disengaged position.

9. The delivery system of claim 8 wherein the said second seal is affixed to the extractor rod, the second seal being adapted to move within the conduit when the extractor rod is reciprocated.

10. The delivery system of claim 8 wherein the said second seal is interposed between the extractor rod and the interior periphery of the conduit.

11. The delivery system of claim 10 wherein the second seal comprises an O-ring, the O-ring being adapted to move with the extractor rod when the extractor rod is reciprocated to prevent loss of pressure in all reciprocated positions of the extractor rod.

12. The delivery system of claim 1 and attaching means to connect the one way valve means and the extractor assembly means in fluid communication with the end of the valve stem.

13. The delivery system of claim 12 wherein the attaching means further comprises an operating lever and an engaging member, the engaging member being normally biased to a position to engage the valve stem and being moved from the valve stem engaging position by operation of the operating lever.

14. The delivery system of claim 1 wherein the vessel is a pneumatic tire.

15. The delivery system of claim 1 or claim 14 wherein the treatment fluid is a tire sealing compound.

* * * * *